United States Patent
Cheng et al.

(10) Patent No.: US 10,772,154 B2
(45) Date of Patent: Sep. 8, 2020

(54) METHOD FOR GENERATING PROMPT MESSAGE FOR NETWORK CONNECTION CONVERSION, AND NETWORK SYSTEM THEREOF

(71) Applicant: WISTRON NEWEB CORPORATION, Hsinchu (TW)

(72) Inventors: Chui-Chu Cheng, Hsinchu (TW); Chih-Wei Chung, Hsinchu (TW); Ying-Chuan Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 50 days.

(21) Appl. No.: 16/215,874

(22) Filed: Dec. 11, 2018

(65) Prior Publication Data
US 2020/0128610 A1  Apr. 23, 2020

(30) Foreign Application Priority Data

Oct. 19, 2018  (TW) ............................. 107136978 A

(51) Int. Cl.
| | |
|---|---|
| H04W 36/30 | (2009.01) |
| H04W 76/34 | (2018.01) |
| H04W 76/15 | (2018.01) |
| H04W 16/26 | (2009.01) |
| H04W 72/08 | (2009.01) |
| H04W 24/10 | (2009.01) |
| H04B 17/318 | (2015.01) |
| H04W 48/20 | (2009.01) |

(52) U.S. Cl.
CPC .......... *H04W 76/34* (2018.02); *H04B 17/318* (2015.01); *H04W 16/26* (2013.01); *H04W 24/10* (2013.01); *H04W 36/30* (2013.01); *H04W 48/20* (2013.01); *H04W 72/085* (2013.01); *H04W 76/15* (2018.02)

(58) Field of Classification Search
None
See application file for complete search history.

(56) References Cited

U.S. PATENT DOCUMENTS

| | | |
|---|---|---|
| 5,768,552 A | 6/1998 | Jacoby |
| 2007/0204231 A1 | 8/2007 | Cunningham et al. |

(Continued)

FOREIGN PATENT DOCUMENTS

WO  2016053291 A1  4/2016

*Primary Examiner* — Jenkey Van
(74) *Attorney, Agent, or Firm* — McClure, Qualey & Rodack, LLP

(57) ABSTRACT

A method for generating a prompt message for network connection conversion and a network system thereof are provided. The system can be a LAN with multiple access points (APs). The method is operated in a root AP. The root AP receives a connection conversion command from a user device, in which a target AP is designated. The root AP determines at least one AP that is available to be connected with the target AP based on an instant wireless signal strength there-between. After that, the target AP obtains at least one connection rates from the target AP to the root AP via the at least one available APs. The root AP generates a prompt message for connection conversion according to the connection rates. A topology map displayed on the user device can be used to indicate the available APs for the connection conversion.

15 Claims, 14 Drawing Sheets

(56) References Cited

U.S. PATENT DOCUMENTS

| | | | |
|---|---|---|---|
| 2011/0264915 A1 | 10/2011 | Cam-Winget et al. | |
| 2015/0264614 A1* | 9/2015 | Stager | H04W 36/0061 |
| | | | 370/332 |
| 2015/0334631 A1 | 11/2015 | Patil et al. | |
| 2016/0088521 A1* | 3/2016 | Ho | H04W 28/08 |
| | | | 455/453 |
| 2017/0374602 A1* | 12/2017 | Gokturk | H04W 48/18 |
| 2018/0062939 A1 | 3/2018 | Kulkarni et al. | |
| 2018/0279192 A1* | 9/2018 | Raissinia | H04W 48/20 |
| 2018/0302832 A1* | 10/2018 | Huang | H04L 45/302 |

\* cited by examiner

METHOD FOR GENERATING PROMPT MESSAGE FOR NETWORK CONNECTION CONVERSION, AND NETWORK SYSTEM THEREOF

CROSS-REFERENCE TO RELATED PATENT APPLICATION

This application claims the benefit of priority to Taiwan Patent Application No. 107136978, filed on Oct. 19, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a method for generating a prompt message of connection conversion, in particular to a method for generating a prompt message relating to the network connection conversion based on a connection rate of an access point, and a network system thereof.

BACKGROUND OF THE DISCLOSURE

WiFi™ technology is widely used in various electronic devices and has become a ubiquitous network application technology. In a local area network (LAN), a terminal device joins the LAN via an access point (AP). The terminal device can thereby communicate with other devices or connect to the Internet.

Multiple APs allows a LAN to expand its coverage and cover an entire area by their interconnections. An automatic interconnection mechanism can be incorporated among the APs for expanding coverage by coordinating the operations of the APs. This automatic interconnection mechanism implements a SON, which is an acronym for Self-Organizing Network. Under this mechanism, any terminal device can search for a suitable AP, according to an environment of the terminal device, for establishing a connection within the LAN. Further, the connection with the AP may change when the terminal device is moved.

Generally, if any connection needs to be changed, the connection setting of the AP or the terminal device will need to be modified. Preferably, before changing the connection, the condition of every connection should be obtained. However, the conventional technology lacks effective referential information to determine how the connection conversion should be made.

SUMMARY OF THE DISCLOSURE

An effective reference is necessary for a network system to determine if changing an original connection with an AP to another AP due to the need of connection conversion among the APs. The disclosure provides a method for generating a prompt message for network connection conversion. In the method, a connection rate can be reference information for connection conversion. When a user selects one of the APs to be connected, the network system can actively remind the user the connection rate as the reference before changing the connection.

According to one of the embodiments of the method, the method for generating a prompt message for network connection conversion can be adapted to a LAN including a plurality of APs. The plurality of APs operating the method includes a root AP. The procedure running in the root AP receives a connection conversion command from a user device in the beginning. A target AP is designated in the connection conversion command. In one embodiment, the user can manipulate the user device to select one of the APs to be the target AP for connection conversion on a screen.

After selecting the target AP, the root AP obtains at least one wireless signal strength between the target AP and at least one AP among the APs, e.g. the neighboring one or more APs. The wireless signal strength is referred to determine at least one connectable AP for the target AP and used to obtain the connection rate from the target AP through the connectable AP to root AP. The software procedure running in the root AP generates a prompt message for connection conversion according to the connection rate.

For example, the prompt message can be a light signal, a color signal or a message shown on the user device for informing the user the connectable APs for the target AP for connection conversion, and the corresponding connection rate from the AP to the root AP.

Furthermore, when the root AP receives the connection conversion command, the software procedure running in the root AP instructs each of APs within the LAN to obtain at least one wireless signal strength with the target AP. The wireless signal strength is then transmitted back to the root AP for forming a measurement result. The measurement result acts as a main reference for determining the connectable one or more APs for the target AP. After that, the root AP can obtain the connection rate from the target AP through every connectable AP to the root AP.

Furthermore, in the embodiment that the root AP obtains the connection rate from the target AP through the connectable AP to the root AP, one of the approaches to get the connection rate is to instruct the target AP to perform a real-time speed test that is able to get the connection rate in response to a real-time speed-test result for each connection.

Furthermore, due to every AP stores the connection rate for each connection with its neighboring APs in advance, the root AP can obtain the history speed data stored in each of the APs for obtaining the connection rates for the connectable APs to the root AP. Therefore, the connection rate from the AP to the root AP can be obtained by directly querying the history speed data.

In another aspect of the method, the connection rate between the target AP and a connectable AP can be obtained by querying a direct connection-speed look-up table and a speed ratio look-up table. The connection rate from the target AP through the connectable AP to the root AP can also be obtained by querying the two tables. The connection rate is then replied to the root AP.

In one embodiment, when the root AP receives the connection conversion command, the root AP instructs the target AP to be ready for connection conversion. The target AP then issues a lock signal to the nodes of its subnet for locking the nodes to maintain the current connections. The lock signal requires the nodes within the subnet not to change the current connections due to the temporary disconnection. This approach can prevent the problem of unstable network due to the connection conversion.

In the meantime, the target AP can firstly disconnect the original connection with an AP. The target AP then issues a unlock signal to the nodes of subnet when the target AP has been established another connection with any AP within the LAN. The unlock signal is configured to release the lock state of the current connections. Thus, the network topology may not be greatly changed before and after the connection conversion procedure.

The techniques and methods adopted by the present invention to achieve the set objective and the efficacies thereof can be further understood with reference to detailed descriptions and drawings of the present invention below. Accordingly, a better understanding of the objective, characteristics, and features of the present invention can be achieved. However, the accompanying drawings are merely provided for reference and demonstration, instead of limiting the present invention.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
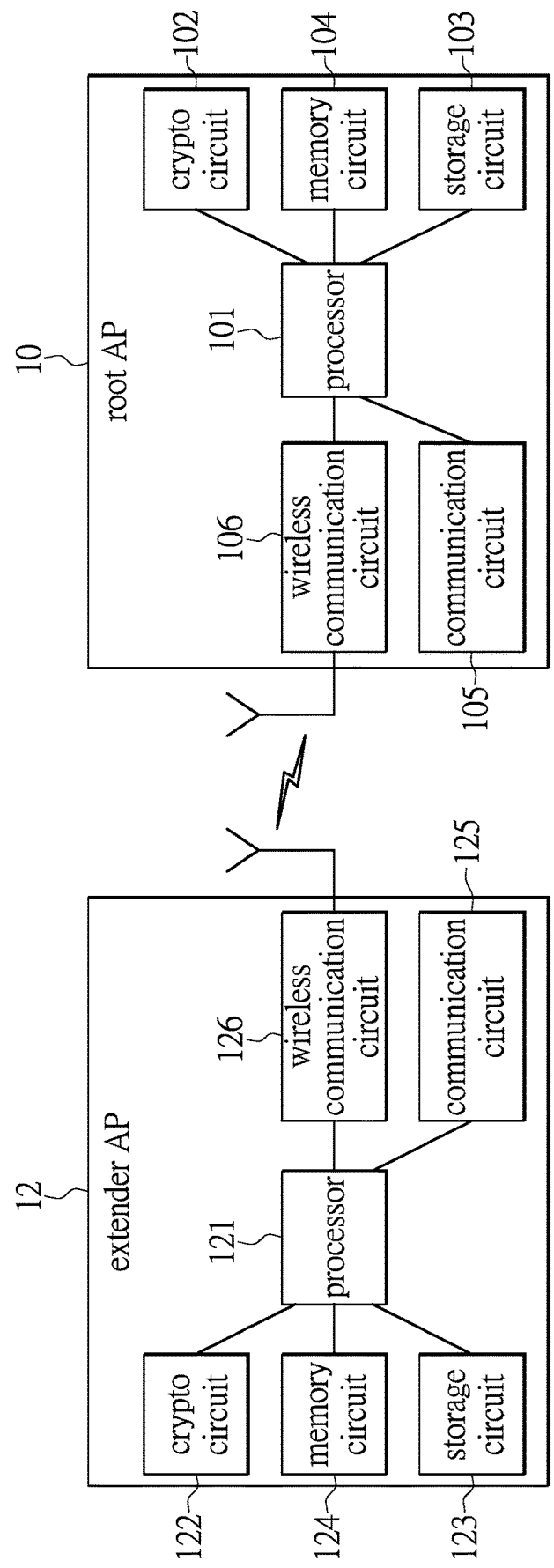
FIG. 1 shows a schematic diagram depicting main electrical components of an access point according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a method for generating a prompt message for network connection conversion and a network system for the same. In one embodiment, the network system is such as a local area network including a plurality of access points (AP). The APs includes a root AP. The root AP acts as a main controller for controlling operations of the access points within the LAN. The root AP can act as a gateway of the LAN for serving external network connection. In another aspect of the disclosure, the root AP can be a node connected with a gateway of the LAN. Preferably, the AP is a WiFi AP that allows a wireless device to connect to a network via WiFi™. In addition to the root AP, the other APs within LAN are extender APs. The root AP, extender APs and the terminal devices join the LAN and form the nodes in the LAN. The network system uses the extender APs disposed at different locations to extend network signals and also expand the network coverage.

The method for generating a prompt message for network connection conversion can be adapted to SON, which is an abbreviation for Self-Organizing Network. The network system provides a software-implemented human-machine interface for a user device manipulated by an administrator or a specific user. The interface allows the user to manage the network system with visual graphics. For example, the setting for individual AP can be made via the interface. The interface also allows the administrator or the user to change connection relationship among the APs so as to conduct connection conversion according to the best connection rate or the like. The network system provides a speed-test result for the user to configure the network connectivity. Alternatively, based on the speed-test result, the network system performs the connection conversion automatically.

Reference is made to FIG. 1 showing a schematic diagram depicting main electrical components of APs, e.g. a root AP 10 and an extender AP 12. Both the root AP 10 and the extender AP 12 have similar electrical components. The root AP 10 includes a wireless communication circuit 106 that can serve network connections under different frequency bands. For example, a WiFi™ chip supports wireless network connection, communication protocol and data processing under 5 GHz and 2.4 GHz. The network system provides various terminal devices to connect to the network by wireless network communication protocol. The root AP 10 includes a communication circuit 105 that includes a communication interface for connecting an external network facility. The root AP 10 acts as a gateway. The communication circuit 105 is used to connect to the external network facility outside the LAN, e.g. Internet. Alternatively the root AP 10 connects with another gateway for establishing a connection with an external network.

The root AP 10 includes a memory circuit 104 that can be a system memory or a buffer for buffering data that is such as the software sequence for operating the root AP 10. The root AP 10 includes a crypto circuit 102 that operates a specific security mechanism such as a software or electrical unit for encrypting or decrypting packets. The root AP 10 includes a storage circuit 103 that acts as a storage inside the root AP 10. The storage circuit 103 stores programs of an operating system and the programs that are necessary for operating the root AP 10, and also the instructions for performing the method for generating a prompt message for network connection conversion. The root AP 10 has a processing unit that includes a processor 101 and peripheral circuits. The processor 101 performs the method for generating a prompt message for network connection conversion.

The extender AP 12 has similar circuits with the root AP 10. The extender AP 12 and the root AP 10 can wirelessly communicate with each other via a wireless communication circuit 126 and the wireless communication circuit 106 respectively. The wireless communication circuit 126 of the extender AP 12 can be used to serve the terminal devices for forming a subnet. The extender AP 12 has a communication circuit 125 that provides wired or wireless connection service. The extender AP 12 also includes a memory circuit 124, a crypto circuit 122, a processor 121 and a storage circuit 123.

Figure 2:
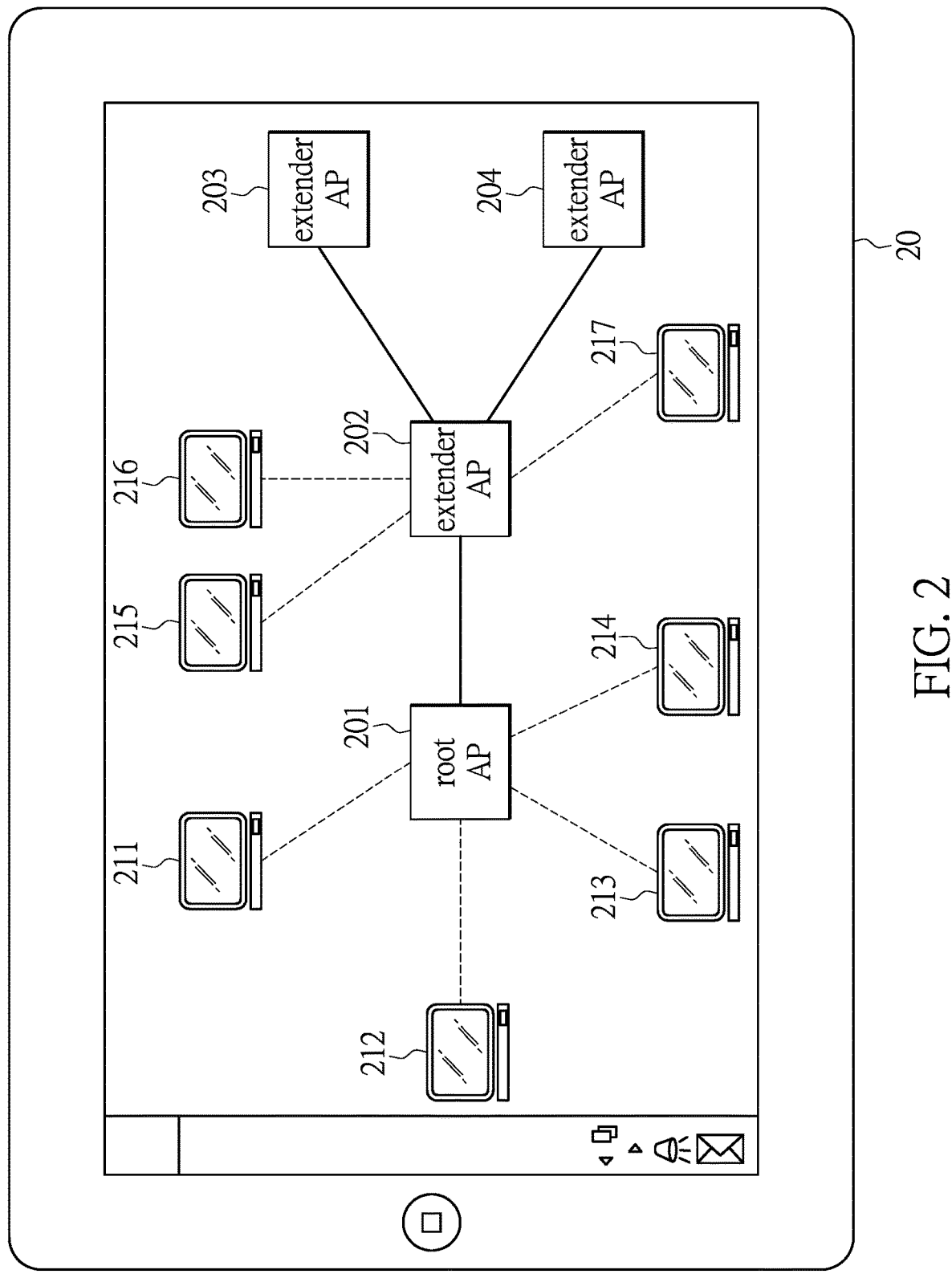
FIG. 2 shows a schematic diagram showing connections of devices in a LAN by using a graphical topology map according to one embodiment of the disclosure.

According to one of the embodiments of the network system of the disclosure, while operating the method for generating the prompt message for network connection conversion, the user can manipulate network connection conversion via a graphical user interface rendered by a software program in the user device. Reference is made to FIG. 2 that shows a schematic diagram of a graphical topology map showing the connectivity among the network devices in the LAN.

A topology map of LAN is graphically shown on a screen of a user device 20 in the drawings. The LAN includes a plurality of access points (APs) that are interconnected so as to form a facility connection diagram, i.e. a topology map. The topology map acts a visualized operating interface that allows the user to manage the network more conveniently and intuitively. In the present example, the LAN includes a root AP 201. The root AP 201 may be one of the access points that serve the terminal devices 211, 212, 213 and 214 to connect with the network. The LAN also includes a plurality of extender APs 202, 203 and 204. The extender AP 202 connects with terminal devices 215, 216 and 217, and serves the terminal devices 215, 216 and 217 to connect to the root AP 201 thereby.

Figure 3:
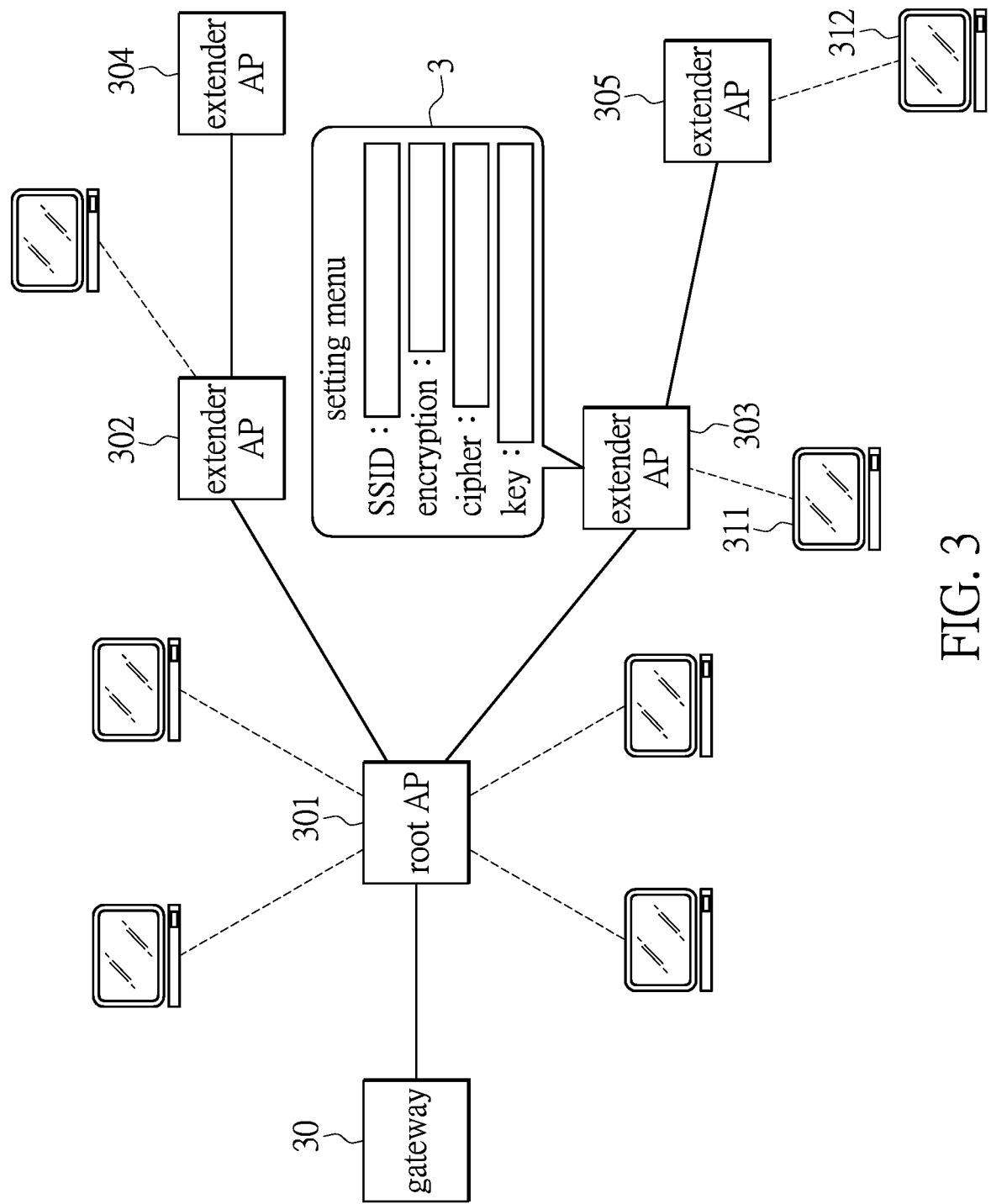
FIG. 3 shows a schematic diagram of setting an AP by using a topology map according to one embodiment of the disclosure.

In one embodiment of the disclosure, the topology map can be displayed on a touch screen of the user device that allows the user to conduct the management by a gesture performed by the user's fingers. For example, a touch-sensitive signal is generated to trigger a setup instruction when an icon of an AP in the topology map is touched by one of the user's fingers. The setup instruction is used to setup a connection relationship and a connection configuration with respect to a node. Reference is made to FIG. 3 that shows a schematic diagram of setting up an AP by the topology map according to one of the embodiments.

A graphical topology map is shown in the drawings. A root AP 301 of the LAN is connected with a gateway 30 that acts as a gateway for connecting with the external network. The LAN also includes several extender APs 302, 303, 304 and 305 that are used to extend the coverage of the network. Each of the extender APs can establish its own subnet. For example, the subnet of the extender AP 303 includes a terminal device 311 connected with the extender AP 303 and the extender AP 305 with a terminal device 312.

In one embodiment of the disclosure, the system using the topology map provides a graphical user interface of a user device. The graphical user interface is such as an operating interface that shows a graphical topology map of the LAN. The topology map shows a plurality of APs of the LAN, the connection lines among the APs, and the connections between at least one terminal device and each of the APs.

If the display of the user device has a touch screen, the user can manage the LAN topology with a gesture. Also, the system allows the administrator or users to conduct the management by other means, e.g. a voice command. The voice command can be converted to an instruction by a voice processing process in the system. The voice command can be used to set up the network configuration and the connection setting for an AP.

Reference is made to FIG. 3 that shows a topology map allowing a user to touch an icon of the AP with a touch screen. The user can also set up the selected AP with his voice. The voice command is converted to the instruction that is recognizable to the network system for setting up the AP. For example, when the user selects the extender AP 303, a dialogue window with a setting menu 3 is displayed on the touch screen. Several user-setting parameters are shown in the setting menu 3 for configuring the extender AP 303. The parameters are such as a Service Set Identifier (SSID), an encryption method, a cipher and a key for the user to set up for connecting with the extender AP.

Next, the user can set up the parameters one by one through the setting menu 3 by the user device. The extender AP 303 needs to be rebooted or related services needed to be restarted for activating the parameters to be applied to the extender AP 303. The information relating to the network parameters may be provided for the terminal devices and other extender AP(s) in the subnet of the extender AP. Thus, when the AP has been setup with new parameters, the network system can be operated with an updated condition. The system also updates the topology map and the related configuration for the user device.

The topology map allows the user to set up the functions such as network connection conversion. In the method for generating a prompt message for network connection conversion, a connection conversion command is generated by a user manipulating a topology map shown on a user device.

The connection conversion command can be converted from a touch signal generated by a touch-sensitive display of the user device. Alternatively, the connection conversion command can also be converted from a voice command by a voice controller. Accordingly, a target AP is designated for performing connection conversion. The target AP is one of APs within the LAN. The root AP of the LAN receives a connection conversion command, and the root AP performs the method for generating a prompt message for network connection conversion.

Figure 4A:
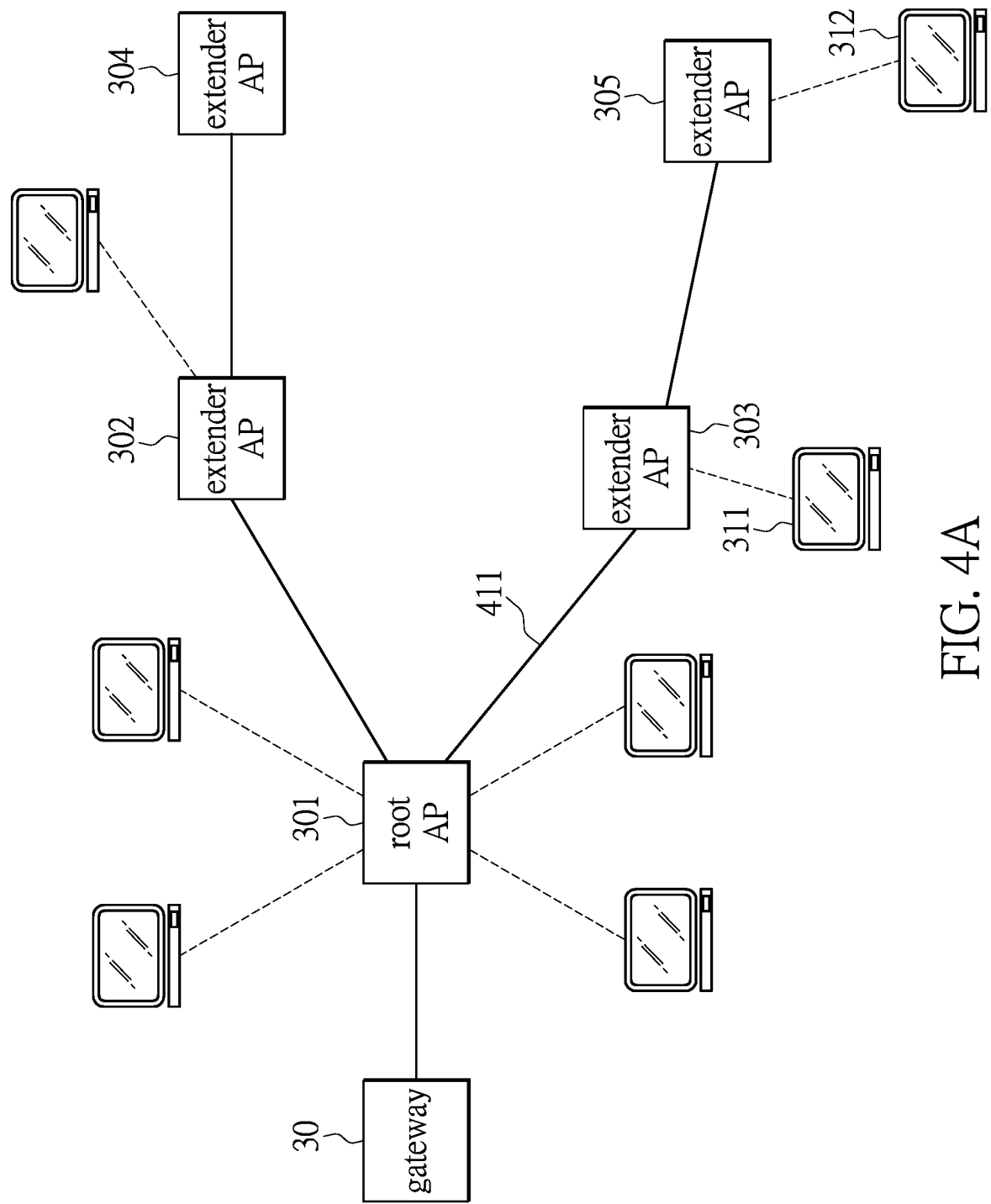
FIGS. 4A and 4B schematically show connection conversion between APs using a graphical topology map according to one embodiment of the disclosure.
Figure 4B:
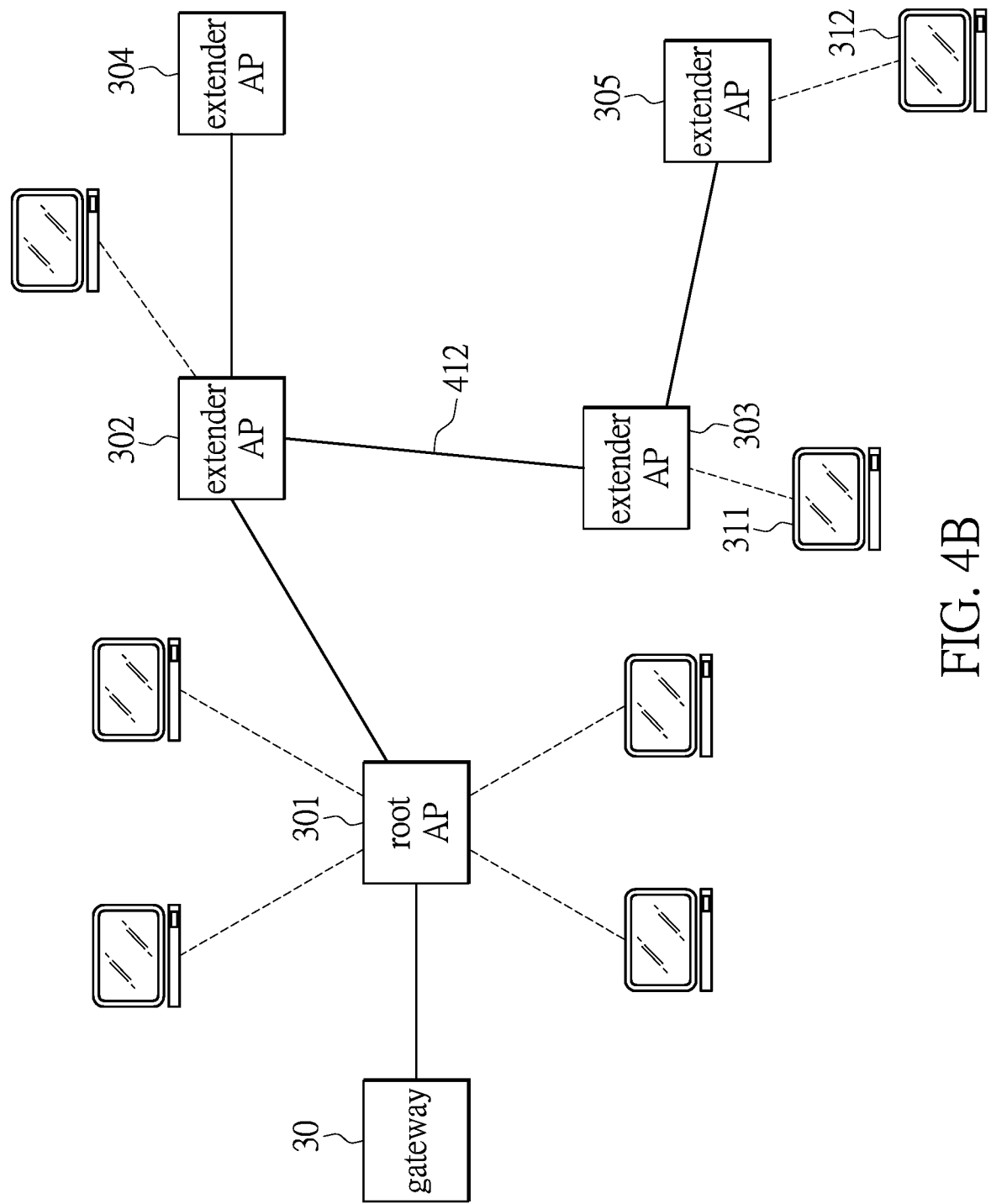
Figure 6:
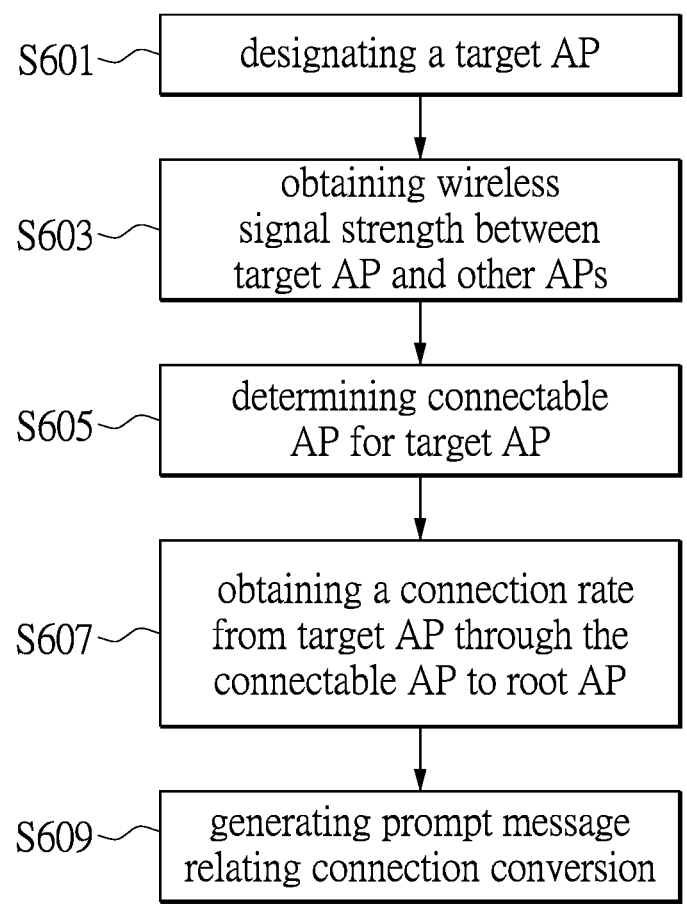
FIG. 6 shows a flow chart describing the method for generating a prompt message for connection conversion according to one embodiment of the disclosure.

FIG. 4A and FIG. 4B schematically use the graphical topology map for showing network connection conversion according to one embodiment of the disclosure. Reference is also made to FIG. 6 showing a flow chart that illustrates the method for generating a prompt message for network connection conversion.

FIG. 4A shows a schematic diagram describing a LAN that includes the root AP 301 and the plurality of extender APs 302, 303, 304 and 305. The root AP 301 connects with several terminal devices. Other APs are such as the extender APs 302, 303, 304 and 305 that are used to extend the coverage of the LAN. Each extender AP builds up its own subnet. FIG. 4A also shows a first connection 411 between the extender AP 303 and the root AP 301.

A user can use a user device to log in the network system. A software sequence running in the user device receives a topology map and the topology map is updated based on requirements. In an exemplary example, an AP shown in the topology map is selected. A touch signal or a voice signal forms a first instruction signal. The first instruction signal is transmitted to the root AP 301. The first instruction signal indicates that the user select the extender AP 303 that is regarded as a target AP. The extender AP 303 is originally connected with the root AP 301 via a first connection 411.

Next, the user uses the topology map to select the extender AP 303 in order to direct the extender AP 303 to connect with another AP, e.g. the extender AP 302. In the meantime, a second instruction signal is generated. The second instruction signal is also transmitted to the root AP 301. Then the root AP 301 issues an instruction to the extender AP 303. In FIG. 4B, the target AP 303 disconnects from the first connection 411 that links to the root AP 301 according to the second instruction signal, and then establishes a second connection 412 with the extender AP 302. The user uses the user device to generate the first instruction signal and the second instruction signal that form a management command, e.g. a connection conversion command, with respect to the network system.

In the present embodiment, the network system accomplishes the connection conversion via the user interface of the user device. A visual operating interface is provided for replacing the conventional operation in that the connection of the AP should be set. Furthermore, in order to complete the operation for connection conversion via the visual operating interface, it is necessary to convert the instructions into setting parameters for re-establishing a new connection. To continuously operating the network system, a software sequence is used to exchange the parameters such as IP, MAC and/or SSID of the APs between the APs, and modify a routing table.

Figure 5:
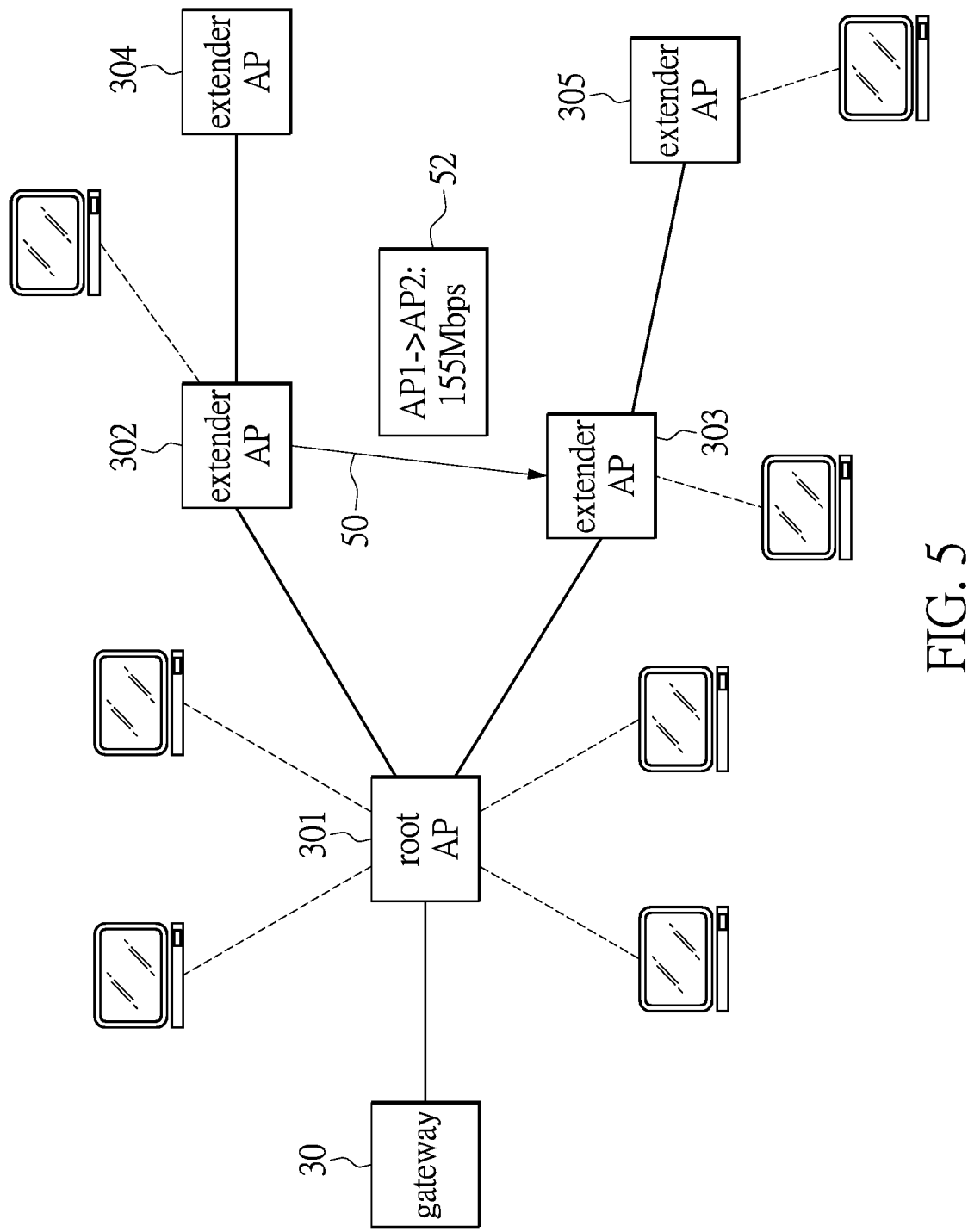
FIG. 5 shows a schematic diagram depicting using a topology map to determine a speed-test direction according to one embodiment of the disclosure.

According to the embodiment of the disclosure, a procedure of speed test can be performed via a graphical user interface. Reference is made to FIG. 5 that shows a schematic diagram describing deciding a speed-test direction on a graphical topology map in one embodiment of the disclosure.

A user launches the speed-test command via the operating interface. FIG. 5 shows a speed-test direction 50 that represents that a connection rate between the extender AP 302 and the extender AP 303 is obtained. A connection rate command is transmitted to the root AP 301 through the LAN. The root AP generates an instruction that controls the extender AP 302 to transmit speed-test packets to the extender AP 303 within a preset time period. The extender AP can calculate the connection rate, i.e. a data rate. The data rate is then notified to the root AP 301. A software sequence running in the root AP 301 generates a speed-test result 52, namely, "AP1→AP2: 155 Mbps." The speed-test result 52 can be shown to the user via the user interface. In one of the methods for calculating the connection rate according to the speed-test packets, the extender AP 302 transmit a number of the speed-test packets as much as possible by the transmission bandwidth within a period of time. The size of packet can be customized. The connection rate can be calculated by multiplying the packet size by the number of packets, and being divided by time to send the packet.

The speed test between two nodes, e.g. the APs, shown in FIG. 5 can be an upload/download speed that is regarded as an important factor affecting a terminal device while it connects with a network and uploads/downloads data. By the speed-test packets, the connection rate (Mbit/s) can be obtained. Alternatively, another way to test speed is to send the packets under a specific communication protocol such as the PING under an Internet Control Message Protocol (ICMP). The receiving end, e.g. the root AP 301, can estimate the network delay according to a round trip delay as responding to PING packets so as to obtain the connection rate.

Therefore, if the network system can obtain the connection rate between any two connectable APs within the LAN, the connection rate is referred to decide a next connectable AP in the connection conversion procedure. Furthermore, the network system also provides wireless signal strength through the user interface for the user before the connection conversion. The wireless signal strength is such as received signal strength indicator (RSSI), signal-to-noise ratio (SNR) and/or the speed-test result. Reference is next made to FIG. 6 that illustrates a flow that a prompt message is generated for a user to determine connection conversion.

In step S601, a user determines an AP that is regarded as the target AP to be connected in a connection conversion procedure. A connection conversion instruction is generated and transmitted to the root AP. The root AP gives an order for connection conversion to the target AP. In step S603, the root AP transmits an instruction to acquire wireless signal strength to the target AP via the interconnected connections. One of the objectives of the instruction is to obtain the at least one wireless signal strength, e.g. RSSI, between the target AP and at least one AP among the APs, e.g. its one or more adjacent APs.

For example, when the target AP receives the instruction for acquiring RSSI from the root AP, the target AP broadcasts scan packets and then the APs which can receive the scan packets generate response packets. A software sequence running in the target AP obtains the RSSI according to the response packets. The target AP accordingly acquires the RSSI between the target AP and its one or more adjacent APs, and responds to the RSSI with respect to at least one AP to the root AP.

In the present embodiment, the wireless signal strength between the target AP and another AP acts as an indicator or a threshold used to filter the connectable APs. Therefore, the user can determine one of the connectable APs to be the AP to be connected. When the wireless signal strength is weak, a stable connection in the connection conversion procedure cannot be obtained as in step S605.

In step S607, the root AP obtains a speed-test result from the target AP via the one or more connectable APs. The speed-test result can be done by the processes described in FIG. 7 through FIG. 11. After that, such as in step S609, the root AP generates a prompt message for the connection conversion between the target AP and the connectable APs to the user.

Figure 7:
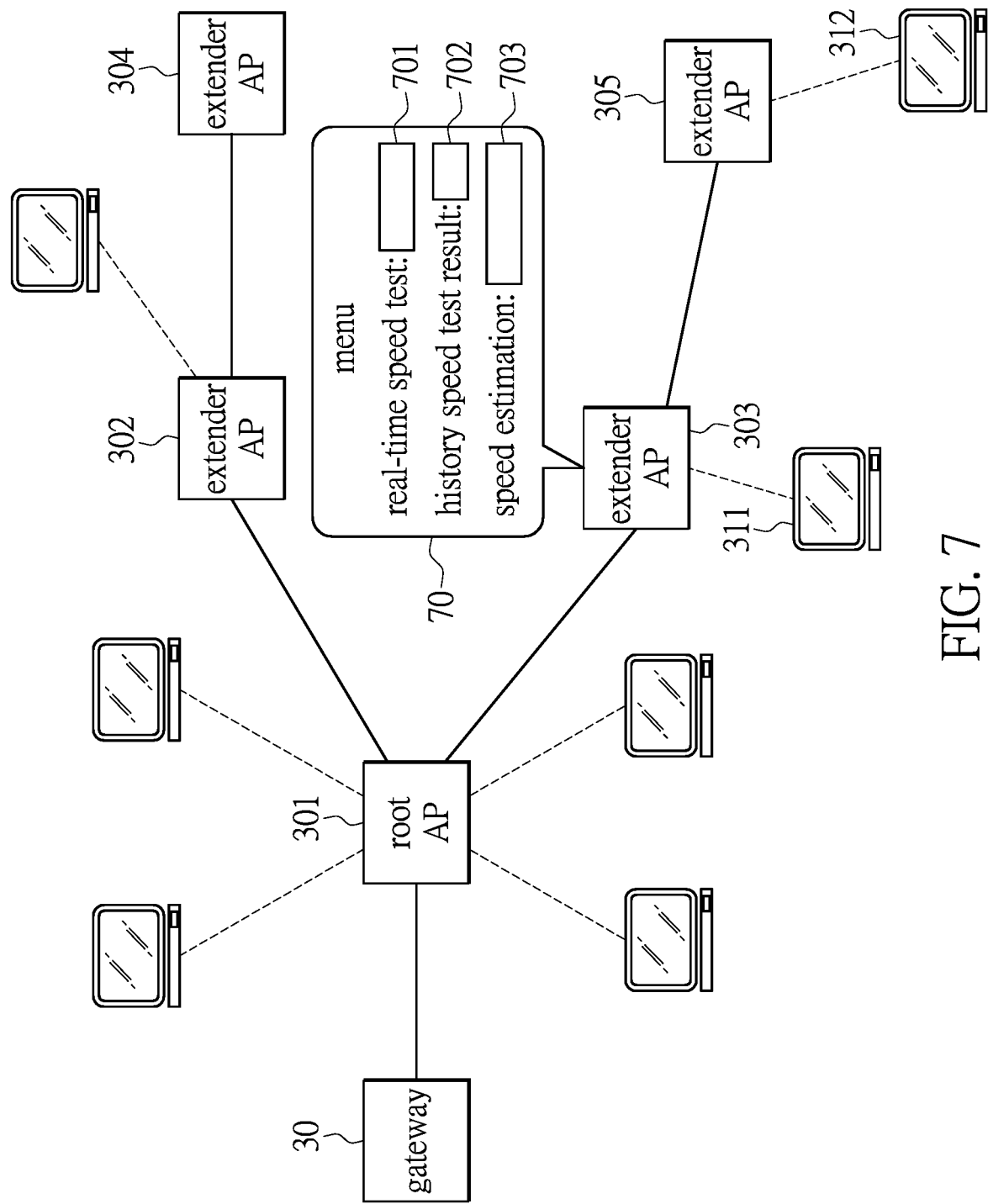
FIG. 7 shows a schematic diagram using a graphical topology map to select a speed-test method according to one embodiment of the disclosure.

FIG. 7 shows a schematic diagram showing using a graphical topology map for the user to choose a speed-test method. The user can use the graphical topology map to execute a speed test. For example, the user can use a gesture or a voice command to select a target AP for performing a speed test. In the present example, the extender AP 303 is selected as the target AP. Firstly, the root AP issues a connection rate command to the target AP after receiving the gesture or voice command. The graphical topology map renders a window for showing a speed-test menu 70. In an exemplary example, the speed-test menu 70 shows, but not limited to, three approaches for acquiring a connection rate. The method is used to obtain at least one speed-test result from the target AP to the root AP via at least one connectable AP.

Figure 8:
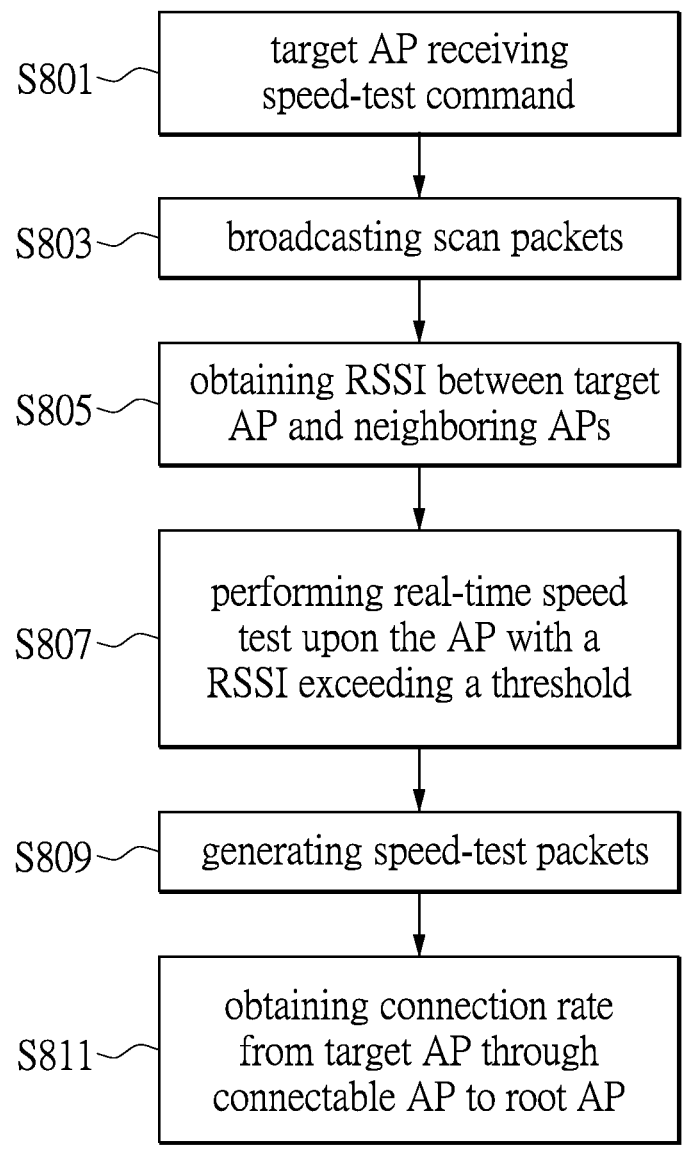
FIG. 8 shows a flow chart describing a real-time speed test procedure in the method for generating a prompt message for network connection conversion according to one embodiment of the disclosure.

One of the methods for acquiring the connection rate is a method of real-time speed test 701. FIG. 8 shows a flow chart illustrating the real time speed test according to one embodiment of the disclosure.

Firstly, when the target AP receives the speed-test command from the root AP (step S801), the target AP issues the scan packets to the one or more adjacent APs (step S803). The RSSIs between the target AP and the adjacent APs can be obtained according to the response packets there-between (step S805). Each of the RSSIs is compared with a threshold. The comparison result can be referred to determine at least one connectable AP for the target AP. A real-time test process is then performed upon the connection with respect to the RSSI exceeding the threshold (step S807). In the meantime, such as in step S809, the target AP generates the speed-test packets, and transmits the speed-test packets to the root AP via the different connectable APs. The root AP receives the speed-test packets so as to calculate the connection rate from the target AP to the root AP via each connectable AP (step S811).

Figure 9:
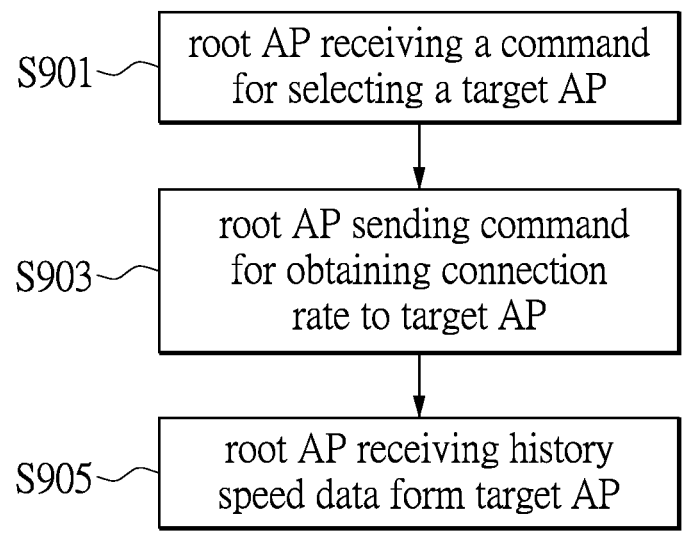
FIG. 9 shows a flow chart describing a speed-test method using history speed data according to one embodiment of the disclosure.

In the approach using a history speed test result 702 to acquire the connection rate, reference is made to FIG. 9 according to one embodiment of the disclosure.

In this approach, the memory of each AP stores history speed data from the AP to a root AP via at least one connectable AP. The connectable AP can be determined based on the RSSI between the APs. The method for generating the history speed data can also be based on the approach described in FIG. 8.

In FIG. 9, when the root AP receives a command of selecting the target AP from the user device (step S901), the root AP issues an instruction for obtaining the connection rate to the target AP (step S903). After that, the target AP queries the history speed data from its memory according to the instruction sent from the root AP. Next, the root AP can obtain the history speed data recording the connection rate from the target AP to the root AP via the connectable AP (step S905). The history speed data can be regarded as the connection rate from the target AP to the root AP via the connectable AP.

In one of the embodiments of the disclosure, the root AP can obtain the history speed data stored in the target AP. The history speed data is based on the history speed test result generated by every AP and stored in the memory of the AP. For example, the history speed data may be generated from the connection rate measured at the time the LAN was established. Alternatively, the history speed data may be formed when the connection rate from the AP to the root AP via the connectable AP is measured during an idle time of the LAN. Further, the history speed data may record the connection rate from the AP to the root AP measured at the last time in the LAN.

Figure 10A:
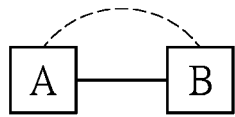
FIG. 10A to FIG. 10C schematically illustrate a speed estimation procedure in the method for generating a prompt message for network connection conversion according to the embodiment of the disclosure.
Figure 10B:
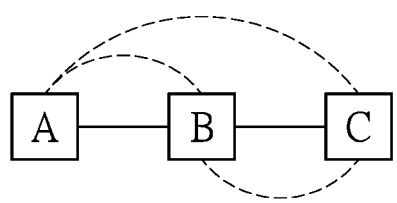
Figure 10C:
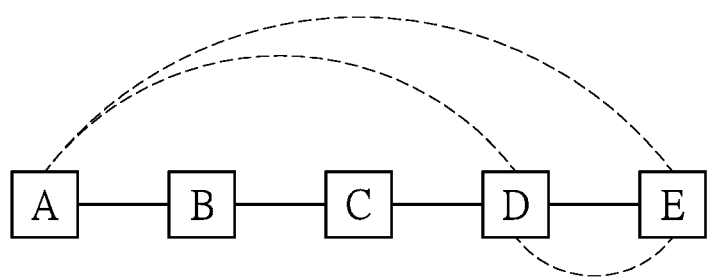

In the approach of speed estimation 703, reference is made to FIGS. 10A to 10C that show the schematic diagrams illustrating the process of speed estimation procedure in one embodiment of the disclosure.

FIG. 10A shows two nodes A and B within the LAN. Referring to Table 1, multiple received signal strengths between the node A and the node B can be obtained by adjusting a distance between the node A and the node B. In the meantime, a speed between the node A and the node B can also be measured by adjusting the distance therebetween. Therefore, multiple comparison data can be obtained so as to form a direct connection-speed look-up table that records the comparison data of received signal strength indicators and speeds between any two adjacent nodes within the LAN. The direct connection-speed look-up table is stored into the memory of each AP.

TABLE 1

| received signal strength indicator (RSSI) | Speed (Mbps) |
| --- | --- |
| −90 | 0 |
| ... | ... |
| −60 | 1300 |
| ... | ... |

FIG. 10B shows nodes A, B, and C that are respectively regarded as a first node, a second node and a third node. A first column of Table 2 records ratios of the speeds obtained from Table 1 between the first node A and the second node B to the speeds obtained from Table 1 between the second node B and the third node C. A second column of Table 2 records ratios of the speeds that are based on actual measurement between the first node A and the third node C to the speeds obtained from Table 1 between the second node B and the third node C.

The ratios recorded in Table 2 form a speed ratio look-up table that records the ratios of the connection rates based on Table 1 or the actual measurement among the first node, the second node and the third node. According to the direct connection-speed look-up table, a first connection rate between the first node and the second node can be obtained; a second connection rate between the second node and the third node can be obtained; and a third connection rate from the first node to the third node can be obtained. Next, a first ratio (AB/BC in Table 2) of the first connection rate to the second connection rate, and a second ratio (AC/BC in Table 2) of the third connection rate to the second connection rate are obtained. Multiple first ratios and second ratios can be obtained by adjusting the received signal strengths between the first node and the second node, and between the second node and the third node. Therefore, the speed ratio look-up table is formed. It should be noted that the nodes described above represent the access points of LAN.

TABLE 2

| AB/BC | AC/BC |
|---|---|
| 0.1 | 0.091 |
| 0.2 | 0.167 |
| ... | ... |
| 1 | 0.5 |
| 1.1 | 0.52 |
| ... | ... |

Table 1 is provided for obtaining the connection rates between any two adjacent APs over a chain type network, e.g. a daisy chain network. The connection rates indicate the connection rates between the first AP and the second AP and the connection rates between the second AP and the third AP. According to Table 2, the connection ratio between two APs is separated by an AP, e.g. the first AP and the third AP.

After repeating the calculations based on the Table 1, the connection rates between any two APs over the chain type network can be obtained. FIG. 10C schematically shows the nodes A, B, C, D, and E. The connection rates between any two adjacent nodes among the nodes A, B, C, D, and E can be obtained according to Table 1. Specifically, connection rates between the nodes A and B, the nodes B and C, the nodes C and D, and the nodes D and E can be obtained from Table 1 since Table 1 records the relationship of multiple received signal strength indicators and the speeds. Table 2 then provides the relationship between the abovementioned first ratio and the second ratio for obtaining a connection rate between nodes A and C. After that, the connection rate between the nodes C and D can be obtained according to Table 1, and the records of Table 2 allow the connection rate between the nodes A and D to be obtained. It should be noted that an interpolation may be used for obtaining the connection rate when failing to obtain from Table 2.

Figure 11:
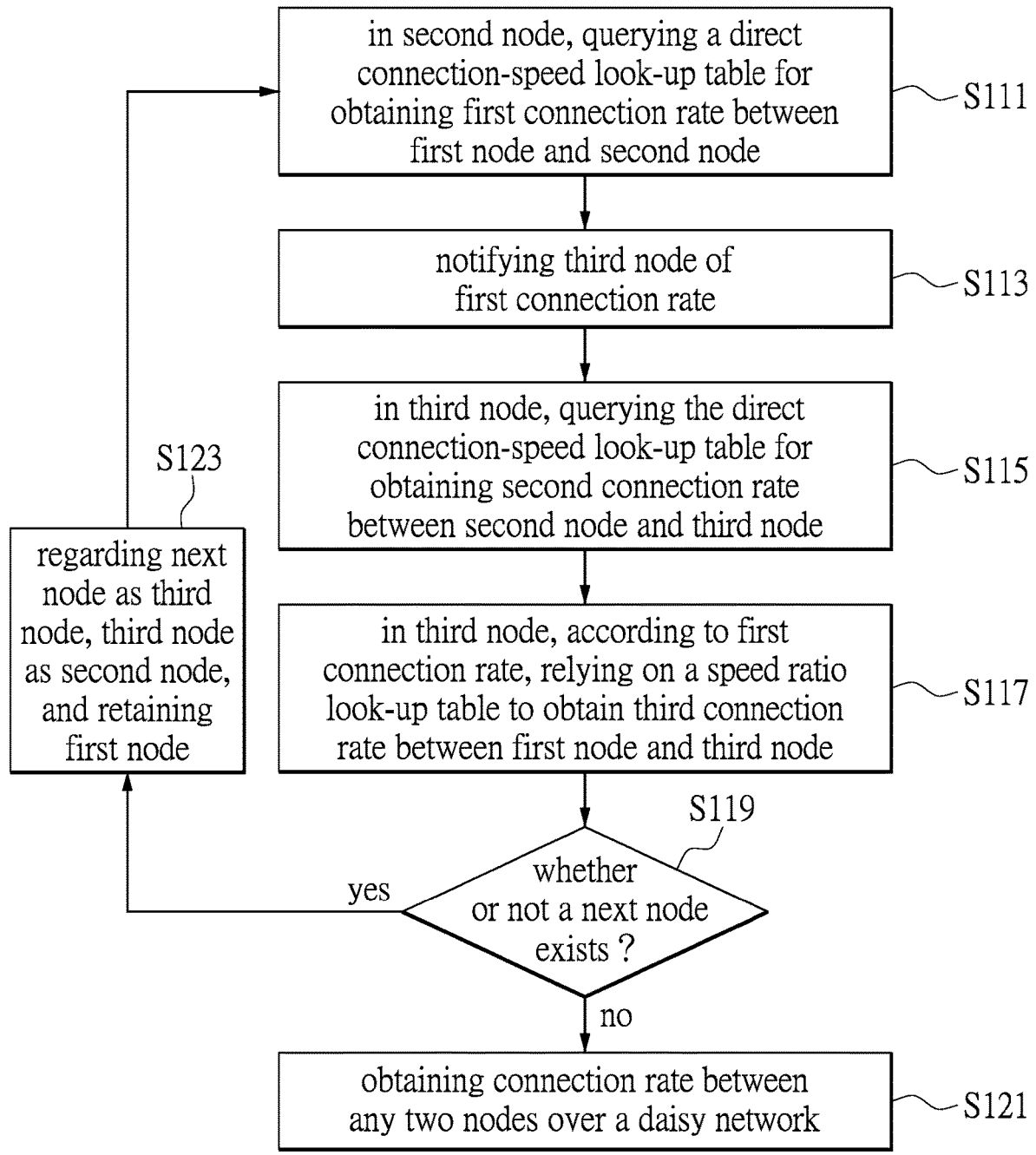
FIG. 11 shows a flow chart describing the speed estimation procedure according to one embodiment of the disclosure.

Reference is made to FIG. 11 that shows a flow chart illustrating the speed estimation procedure in one embodiment of the disclosure.

In the present speed estimation procedure, a direct connection-speed look-up table can be found in the second node so as to obtain a first connection rate between a first node and the second node (step S111). Next, by the root AP, a third node is notified of the first connection rate (step S113). In the third node, by querying the direct connection-speed look-up table, a second connection rate between the second node and third node can be obtained (step S115). In the third node, according to the first connection rate and the speed ratio look-up table, e.g. Table 2 (step S117), a third connection rate between the first node and the third node can be obtained. In the meantime, such as in step S119, it will be determined if any next node exists.

If there is no next node, the speed estimation procedure ends. In step S121, the connection rate between any two nodes over a daisy chain network can be obtained. If there is a next node, such as in step S123, the next node is considered a third node. The above third node is considered a second node. The first node is retained. The process continues to step S111. After repeating the above operation, the connection rates between any two APs within the LAN can be obtained.

According to one of the embodiments, the abovementioned first node acts as the root AP of the whole network system. According to the direct connection-speed look-up table, e.g. Table 1, at least one connection rate between the target AP and the at least one connectable AP can be obtained. Further, according to the speed ratio look-up table, e.g. Table 2, the connection rate from the target AP to the root AP via at least one connectable AP is obtained. The result of these connection rates are then sent to the root AP.

It is worth noting that, while the network system operates the network connection conversion, the network system allows the terminal devices within the subnet to connect the other APs according to a default connection mechanism if the AP has already formed a subnet with these terminal devices. After the network connection conversion is completed, the terminal devices can be converted back to the original connections with the original AP. However, the network system can adopt the approaches described in FIG. 12 or FIG. 13 for maintaining stability of the network.

Figure 12:
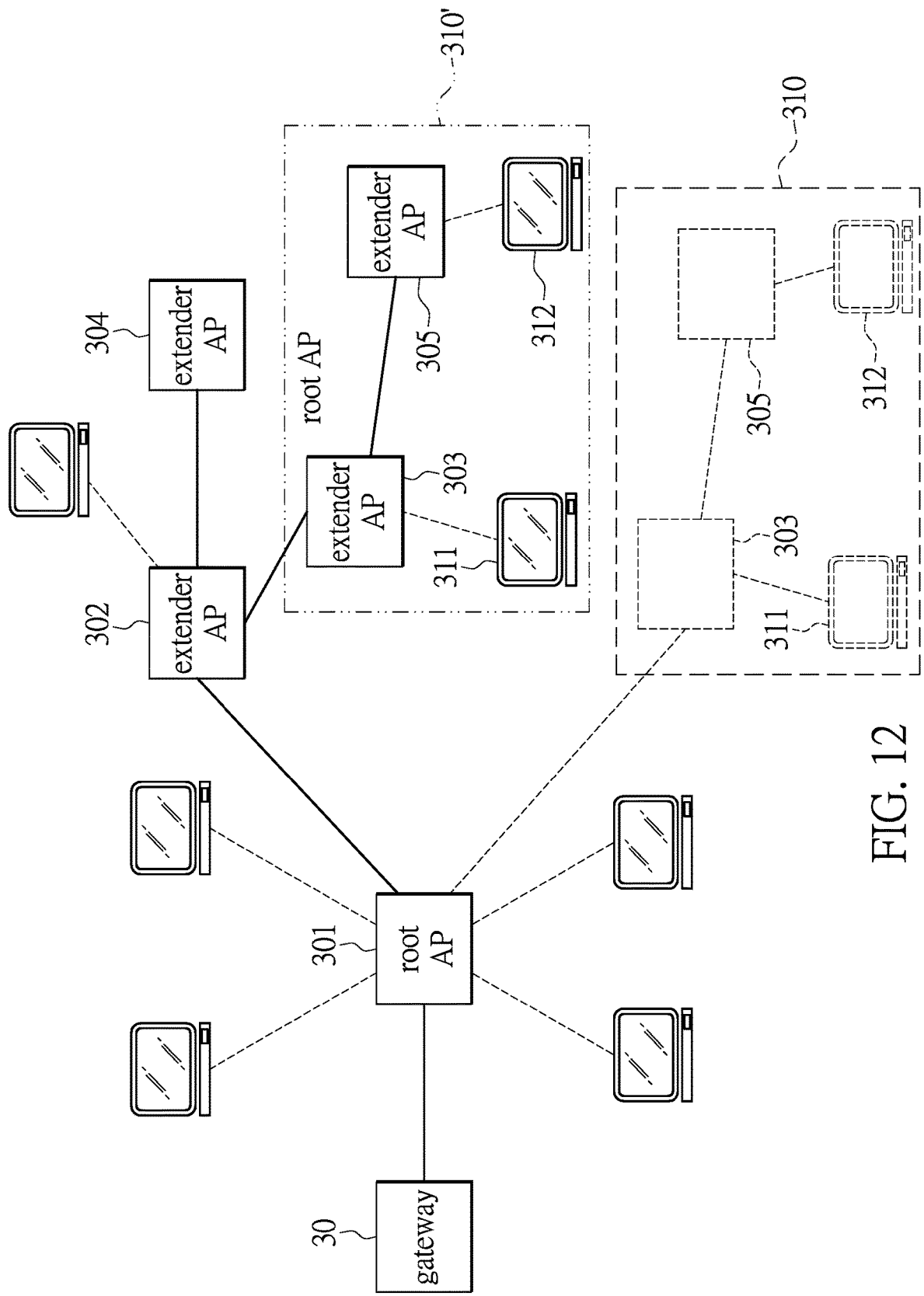
FIG. 12 shows a schematic diagram depicting performing connection conversion according to one embodiment of the disclosure.
Figure 13:
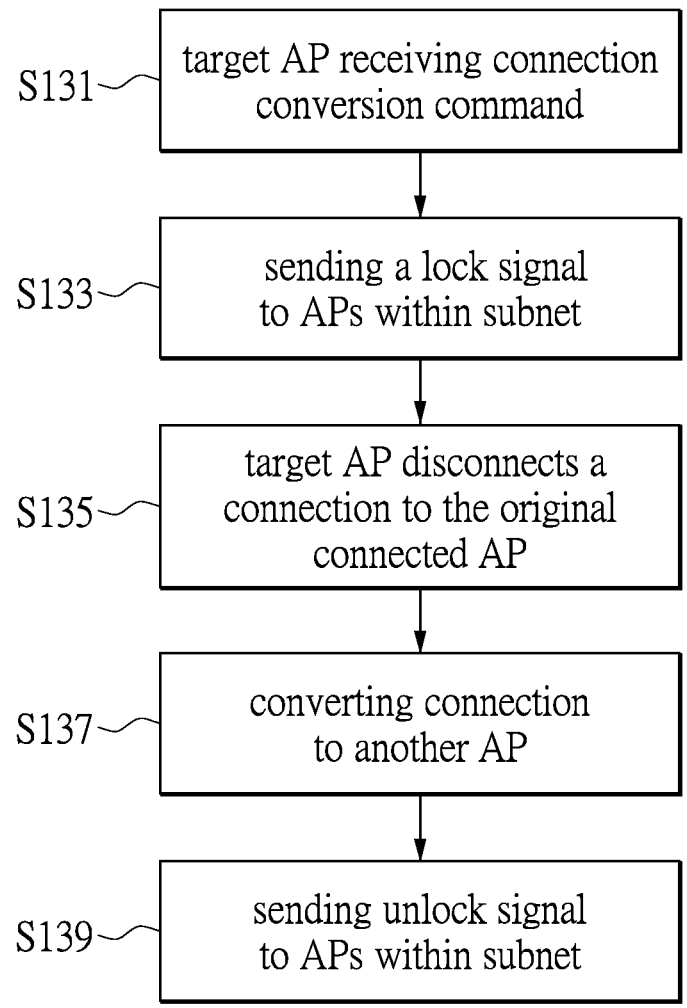
FIG. 13 shows a flow chart depicting a process of connection conversion in the method for generating a prompt message for network connection conversion according to the embodiment of the disclosure.

FIG. 12 shows a schematic diagram describing a circumstance for connection conversion. The root AP 301 originally connects with the extender AP 303 having a subnet 310. The extender AP 305 and the terminal devices 311 and 312 are within the subnet 310. Reference is also made to FIG. 13 showing a related process according to one embodiment of the disclosure.

The extender AP 303 acts as the target AP of the present example. The extender AP 303 receives the connection conversion instruction from the root AP 301. The instruction points out the extender AP 303 and a new connection to be converted. The new connection is directed to the extender AP 302 (step S131). The extender AP 303 issues a lock signal to the extender AP 305 of the subnet 310 (step S133). The lock signal is used to maintain the connection between the extender AP 305 and the target AP. After that, the extender AP 303 disconnects the connection with the original connected AP, e.g. the root AP 301 (step S135).

The extender AP 303 then converts the connection to the extender AP 302 (step S137). The extender AP 303 issues an unlock signal to the extender AP 305 within a subnet 310' in order to release the lock relationship between the extender AP 305 and the extender AP 303. The connectivity is then recovered when the target AP re-connects with any AP within the LAN (step S139). FIG. 12 exemplarily shows the original connection with the subnet 310 is converted to another connection with the subnet 310'. Therefore, the network topology may not have ambiguous changes before and after the connection conversion process.

In conclusion, the above described embodiments of the method for generating a prompt message for network connection conversion provides a new technology of connection conversion, in particular allowing the user to set up the nodes within the LAN by the visualized topology map. For example, the connections among the nodes of the LAN can be modified directly using the topology map. The method also provides the approaches for the speed test and connection conversion that allows the network administrator to conduct network management more intuitively.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for generating a prompt message for network connection conversion, adapted to a LAN including a plurality of APs, and the method operated in a root AP among the plurality of APs, the method comprising:
receiving a connection conversion command from a user device, wherein the connection conversion command designates a target AP among the plurality of APs, and the root AP instructing the target AP to issue a lock signal to at least one AP within a subnet for maintaining a connection between the at least one AP and the target AP and disconnect an original connection between the target AP and an originally-connected AP;
obtaining at least one wireless signal strength between the target AP and at least one AP among the plurality of APs for determining at least one connectable AP for the target AP;
obtaining at least one connection rate from the target AP through the at least one connectable AP to the root AP; and
generating a prompt message for connection conversion according to the at least one connection rate;
when the target AP re-connects with any AP of the LAN, the target AP issues a unlock signal to the at least one AP of the subnet, so as to release a lock relationship between the target AP and the at least one AP of the subnet.

2. The method according to claim 1, wherein, after the root AP receives the connection conversion command, the root AP instructs the target AP to obtain the at least one wireless signal strength between the target AP and the at least one AP within the LAN, and reply the at least one wireless signal strength to the root AP.

3. The method according to claim 2, wherein the root AP compares the at least one wireless signal strength received from the target AP with a threshold so as to determine the at least one connectable AP for the target AP.

4. The method according to claim 3, wherein the root AP issues a connection rate command to the target AP for obtaining the at least one connection rate from the target AP through the at least one connectable AP to the root AP.

5. The method according to claim 4, wherein the root AP instructs the target AP to perform a real-time speed test procedure, receives speed-test packets and calculates the at least one connection rate from the target AP through the at least one connectable AP to the root AP.

6. The method according to claim 4, wherein the root AP obtains at least one history speed data stored in the target AP for obtaining the at least one connection rate from the target AP through the at least one connectable AP to the root AP.

7. The method according to claim 4, wherein the target AP performs a speed estimation procedure according to the connection rate command, wherein the speed estimation procedure includes:
querying a direct connection-speed look-up-table that records comparison data of a plurality of received signal strength indicators (RSSIs) and connection rates between two interconnected nodes within the LAN;
querying a speed ratio look-up table that records a plurality of connection rates among a first node, a second node and a third node sequentially within the LAN; wherein the direct connection-speed look-up-table is used to obtain a first connection rate between the first node and the second node and a second connection rate between the second node and the third node, and to measure a third connection rate between the first node and the third node; next, a first ratio of the first connection rate to the second connection rate and a second ratio of the third connection rate to the second connection rate are measured; the plurality of first ratios and second ratios are obtained after the received signal strength between the first node and the second node and the RSSI between the second node and the third node are adjusted so as to form the speed ratio look-up table; wherein the nodes represent the APs of the LAN; and
obtaining at least one connection rate between the target AP and at least one connectable AP according to the direct connection-speed look-up table; based on the speed ratio look-up-table, obtaining a connection rate from the target AP to the root AP via the at least one connectable AP, and transmitting the connection rate to the root AP.

8. A network system, comprising:
a plurality of APs forming a LAN, wherein the plurality of APs include a root AP, and each of the APs provides network connection service to any connected terminal device;
a processor disposed in the root AP and used to perform a method for generating a prompt message for network connection conversion, wherein the method includes:
receiving a connection conversion command from a user device, wherein the connection conversion command designates a target AP among the plurality of APs, and the root AP instructing the target AP to issue a lock signal to at least one AP within a subnet for maintaining a connection between the at least one AP and the target AP and disconnect an original connection between the target AP and an originally-connected AP;
obtaining at least one wireless signal strength between the target AP and at least one AP among the plurality of APs for determining at least one connectable AP for the target AP;
obtaining at least one connection rate from the target AP through the at least one connectable AP to the root AP; and
generating the prompt message for connection conversion according to the at least one connection rate;
when the target AP re-connects with any AP of the LAN, the target AP issues a unlock signal to the at least one AP of the subnet, so as to release a lock relationship between the target AP and the at least one AP of the subnet.

9. The system according to claim 8, wherein, after the root AP receives the connection conversion command, the root AP instructs the target AP to obtain the at least one wireless signal strength between the target AP and the at least one AP within the LAN, and reply the at least one wireless signal strength to the root AP.

10. The system according to claim 9, wherein the root AP compares the at least one wireless signal strength received from the target AP with a threshold so as to determine the at least one connectable AP for the target AP.

11. The system according to claim 10, wherein the root AP obtains a speed-test result from the target AP through at least one connectable AP to the root AP.

12. The system according to claim 10, wherein the root AP issues a connection rate command to the target AP for obtaining the at least one connection rate from the target AP through the at least one connectable AP to the root AP.

13. The system according to claim 12, wherein the root AP instructs the target AP to perform a real-time speed test procedure, receives speed-test packets and calculates the at least one connection rate from the target AP through the at least one connectable AP to the root AP.

14. The system according to claim 12, wherein the root AP obtains at least one history speed data stored in the target AP for obtaining the at least one connection rate from the target AP through the at least one connectable AP to the root AP.

15. The network system according to claim 12, wherein the target AP performs a speed estimation procedure according to the connection rate command, wherein the speed estimation procedure includes:
   querying a direct connection-speed look-up table that records comparison data of a plurality of received signal strength indicators (RSSIs) and connection rates between two interconnected nodes within the LAN;
   querying a speed ratio look-up table that records a plurality of connection rates among a first node, a second node and a third node sequentially within the LAN; wherein the direct connection-speed look-up table is used to obtain a first connection rate between the first node and the second node and a second connection rate between the second node and the third node, and to measure a third connection rate between the first node and the third node; next, a first ratio of the first connection rate to the second connection rate and a second ratio of the third connection rate to the second connection rate are measured; the plurality of first ratios and second ratios are obtained after the received signal strength between the first node and the second node and the RSSI between the second node and the third node are adjusted so as to form the speed ratio look-up table; wherein the nodes represent the APs of the LAN; and
obtaining at least one connection rate between the target AP and at least one connectable AP according to the direct connection-speed look-up table; based on the speed ratio look-up table, obtaining a connection rate from the target AP to the root AP via the at least one connectable AP, and transmitting the connection rate to the root AP.

\* \* \* \* \*